United States Patent [19]

Yamashita

[11] Patent Number: 4,460,538

[45] Date of Patent: Jul. 17, 1984

[54] CORE CONSTRUCTION OF NUCLEAR REACTOR

[75] Inventor: Junichi Yamashita, Hitachi, Japan

[73] Assignee: Hitachi, Ltd., Tokyo, Japan

[21] Appl. No.: 915,580

[22] Filed: Jun. 15, 1978

[30] Foreign Application Priority Data

Jun. 20, 1977 [JP] Japan .................................. 52-73693

[51] Int. Cl.³ .............................................. G21C 1/02
[52] U.S. Cl. ..................... 376/267; 376/428; 376/435
[58] Field of Search ....................... 176/17, 18, 22, 40, 176/50, 76, 78, 54; 376/267, 428, 435

[56] References Cited

U.S. PATENT DOCUMENTS

| | | | |
|---|---|---|---|
| 3,145,149 | 8/1964 | Imhoff | 176/78 |
| 3,147,191 | 9/1964 | Crowther | 176/78 |
| 3,158,543 | 11/1964 | Sherman et al. | 176/17 |
| 3,212,983 | 10/1965 | Kornbichler | 176/78 |
| 3,745,069 | 7/1973 | Sofer et al. | 176/78 |
| 3,933,582 | 1/1976 | MacNabb | 176/78 |
| 4,059,484 | 11/1977 | Bupp et al. | 176/78 |
| 4,096,033 | 6/1978 | Barry | 176/78 |

FOREIGN PATENT DOCUMENTS 49-81796  8/1974  Japan .
51-12793  4/1976  Japan .

Primary Examiner—Sal Cangialosi
Attorney, Agent, or Firm—Antonelli, Terry & Wands

[57] ABSTRACT

A core construction of a boiling-water nuclear reactor including an array of fuel assemblies and control rods wherein the fuel assemblies are each divided into two sections or upper and lower sections in the vicinity of the center of the length thereof and each lower section has a smaller mean infinite multiplication factor than each upper section. Of the fuel assemblies, those fuel assemblies which are located adjacent the control rods selected for power control each have a smaller overall means infinite multiplication factor than those fuel assemblies which are located adjacent the control rods other than the selected control rods.

7 Claims, 8 Drawing Figures

FIG. 3

| 35 | 34 | 34 | 33 | 33 | 33 | 34 | 35 |
|----|----|----|----|----|----|----|----|
| 34 | 33 | 32 | 32 | 31 | 31 | 33 | 34 |
| 34 | 32 | 31 | 31 | 31 | 36 | 31 | 33 |
| 33 | 32 | 31 | 31 | 15 | 31 | 31 | 33 |
| 33 | 31 | 31 | 15 | 31 | 31 | 32 | 33 |
| 33 | 31 | 36 | 31 | 31 | 31 | 32 | 34 |
| 34 | 33 | 31 | 31 | 32 | 32 | 33 | 34 |
| 35 | 34 | 33 | 33 | 33 | 34 | 34 | 35 |

FIG. 4

| 35 | 34 | 34 | 33 | 33 | 33 | 34 | 35 |
|----|----|----|----|----|----|----|----|
| 34 | 33 | 32 | 32 | 31 | 31 | 33 | 34 |
| 34 | 32 | 31 | 31 | 31 | 36 | 31 | 33 |
| 33 | 32 | 31 | 31 | 15 | 31 | 31 | 33 |
| 33 | 31 | 31 | 15 | 31 | 31 | 32 | 33 |
| 33 | 31 | 36 | 31 | 31 | 31 | 32 | 34 |
| 34 | 33 | 31 | 31 | 32 | 32 | 33 | 34 |
| 35 | 34 | 33 | 33 | 33 | 34 | 34 | 35 |

CORE CONSTRUCTION OF NUCLEAR REACTOR

LIST OF PRIOR ART REFERENCES

The following references are cited to show the state of the art:

Japanese Pat. Appln. Kokai (Laid-Open) No. 30790/74, Mar. 19, 1974

Japanese Pat. Appln. Kokai (Laid-Open) No. 78092/74 July 27, 1974

Japanese Pat. Appln. Kokai (Laid-Open) No. 81796/74 Aug. 7, 1974

Japanese Pat. Appln. Kokoku (Post-Exam. Publn.) No. 12793/76 Apr. 22, 1976

BACKGROUND OF THE INVENTION

This invention relates to core constructions of nuclear reactors and more particularly to a core construction of a boiling-water nuclear reactor having an array of fuel assemblies and control rods.

The core of a boiling-water nuclear reactor comprises an array of fuel assemblies and control rods, and the power developed by the reactor is controlled by inserting or withdrawing the control rods. It has hitherto been customary to use those fuel assemblies which are uniform in infinite multiplication factor throughout the length thereof.

In a boiling-water nuclear reactor, an axial void distribution in which the volumetric rate increases in going from the lower region of the core toward the upper region thereof tends to occur during the operation of the reactor to develop power. Thus the use of the fuel assemblies of the aforesaid type of the prior art has caused a skewing in power distribution in which a peak power is developed in the lower region of the core. As a result, withdrawing a control rod has given rise to a sudden change in thermal load applied to the fuel assemblies located adjacent the withdrawn control rod, particularly in those sections of the fuel assemblies which show a peak power. Such change in thermal load has often led the occurrence of a pellet-clad-mechanical-interaction (hereinafter referred to as a PCMI) between the fuel pellets and the casing or cladding of each fuel rod of the fuel assemblies, thereby causing failure of the fuel rods.

In order to avoid the aforesaid problem, proposals have been made to use fuel assemblies in which a mean infinite multiplication factor is smaller in a lower section of each fuel assembly than in an upper section thereof. For example, Japanese Pat. Appln. Kokai (Laid-open) No. 30790/74 describes fuel elements in which the fuel pellets packed in each cladding have a smaller diameter in the lower section of each fuel element than in the upper section thereof. Japanese Pat. Appln. Kokai (Laid-open) No. 78092/74 discloses fuel elements in which the fuel pellets packed in each cladding are hollow in the lower section of each fuel element. Also, Japanese Pat. Appln. Kokai (Laid-open) No. 81796/74 discloses fuel elements in which the fuel pellets packed in each cladding have a lower density in the lower section of each fuel element than in the upper section thereof.

Proposals have been made to use fuel rods which contain gadolinea ($Gd_2O_3$) or other burnable poison fitted in a portion of each fuel rod in which a peak power is developed.

The use of the aforesaid fuel elements or rods have been instrumental in suppressing, to a certain degree, the development of a peak power in the lower region of the core. However, a change in thermal load applied to the fuel elements caused by the withdrawing of a control rod still exceeds the power of a reactor at which a PCMI is caused, so that the danger of bringing about a PCMI still remains to be eliminated.

The inability of core constructions of the prior art to eliminate the possibility of the occurrence of a PCMI has made controlling the power of a nuclear reactor a complex and time-consuming process. More specifically, the danger of the occurrence of a PCMI has precluded the withdrawing of the control rods freely as desired, with the result that the common practice has been to withdraw the control rods to a certain degree and then lower the power of the reactor temporarily.

SUMMARY OF THE INVENTION

An object of the invention is to provide a core construction of a boiling-water nuclear reactor capable of satisfactorily supressing the skewing of a power distribution caused by an axial void distribution in the core.

Another object is to provide a core construction of a nuclear reactor in which a change in thermal load applied to the fuel assemblies located adjacent a control rod which is withdrawn during the operation of the reactor to develop power does not exceed the power at which the PCMI begins to occur, so that the fuel can be kept in a sound condition.

Still another object is to provide a core construction of a nuclear reactor which enables the control rods to be withdrawn freely as desired during the operation of the reactor to develop power without the danger of occurrence of a PCMI, so that control of reactor power can be effected in a simple process and within a short period of time.

A further object is to provide a core construction of a nuclear reactor which permits time required for effecting reactor power control during the operation of the reactor to develop power to be greatly shortened so as to thereby markedly increase the operation efficiency and the economic value of the reactor.

According to the invention, there is provided a core construction of a boiling-water nuclear reactor comprising an array of fuel assemblies and control rods, wherein the fuel assemblies are each divided into two sections or upper and lower sections in the vicinity of the center of the length thereof and each lower section has a smaller mean infinite multiplication factor than each upper section and wherein those fuel assemblies which are located adjacent the control rods selected for power control each have a smaller overall mean infinite multiplication factor than those fuel assemblies which are located adjacent the control rods other than the selected control rods.

BRIEF DESCRIPTION OF THE DRAWINGS

FIG. 3 is a view in explanation of one type of fuel assemblies located adjacent the reactor power adjusting control rod in the core construction according to the invention;

FIG. 4 is a view in explanation of the other type of fuel assemblies located adjacent the reactor shutdown control rod in the core construction according to the invention;

DESCRIPTION OF THE PREFERRED EMBODIMENT

Figure 1:
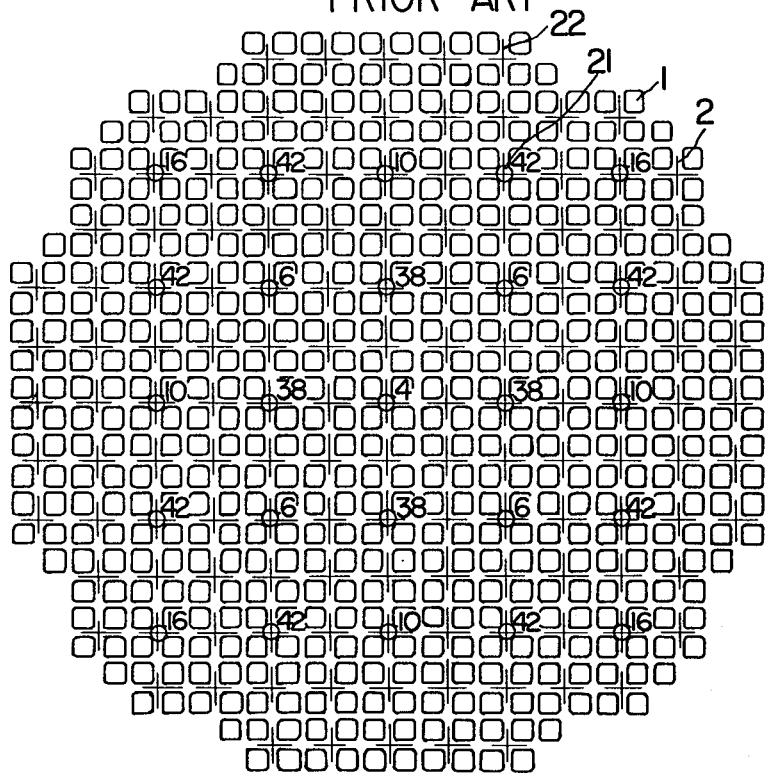
FIG. 1 is a transverse sectional view of a core construction of the prior art of a boiling-water nuclear reactor.

FIG. 1 is a transverse sectional view of one type of core construction of the prior art of a boiling-water nuclear reactor, in which a plurality of groups of fuel assemblies 1, each group consisting of four (4) fuel assemblies 1, are arranged in rows and columns disposed at right angles to one another. A control rod 2 is located adjacent and surrounded by the four fuel assemblies 1 of each group. Each fuel assembly 1 consists of sixty-two (62) fuel rods and two (2) water rods, each fuel rod having gadolinea fitted in a portion thereof in which a peak power is developed.

During the operation of the reactor to develop power, reactor power is controlled by inserting or withdrawing the control rods 2. FIG. 1 shows one pattern of insertion of the control rods 2 during the operation of the reactor. In the figure, a set of control rods 21 marked with o are those which are inserted in the core, and the numerals written to the side of the control rods 21 each indicate the degree of insertion of the control rod. For example, the numeral o indicates full insertion while the numeral 48 indicates full withdrawal. Thus the control rod 21 having a numeral 42 written to its side has 42/48 of its length withdrawn from the core. The other set of control rods 22 having no mark o are those which are fully withdrawn from the core, with the numeral indicating the degree of withdrawal being omitted.

As aforesaid, the fuel rods of each fuel assembly 1 have gadolinea fitted therein. Thus a portion of each fuel assembly 1 in which gadolinea is disposed in considered to have an infinite multiplication factor which is smaller than that in other portion of the assembly. By this arrangement, the skewing of the power distribution in which a peak power is developed in the lower section of each fuel assembly 1 can be suppressed to a certain degree. The fuel assemblies 1 shown in FIG. 1 have been found to have a peak power value of about 1.5 (See Fig. 5).

Meanwhile it is known that, in the aforesaid type of nuclear reactor, a PCMI begins to take place between the fuel pellets and the cladding of each fuel rod when the linear heat generating rate of the fuel rod exceeds about 8 Kw/ft. Thus the linear heat generating rate of 8 Kw/ft. is referred to as the critical power for the occurrence of a PCMI.

In the aforesaid core construction of the prior art, a change in thermal load applied to the fuel assemblies 1 which is caused by the withdrawing of the control rods 21 inserted in the core still exceeds the critical power of 8 Kw/ft. for the occurrence of a PCMI. Thus it has been impossible to withdraw the control rods 21 as desired. This has made it mandatory to withdraw the control rods in a complicated process in which the control rods are withdrawn to a certain extent and then reactor power is reduced temporarily, in effecting reactor power control during the operation of the reactor. This process is complex and time consuming.

This invention has been developed for the purpose of providing a core structure which enables the inserted control rods to be withdrawn freely for controlling reactor power during the operation of the reactor for developing power, by improving the radial core power distribution characteristic in addition to improving the axial core power distribution characteristic by suppressing a peak power still further in the axial power distribution of the fuel assemblies.

Figure 2:
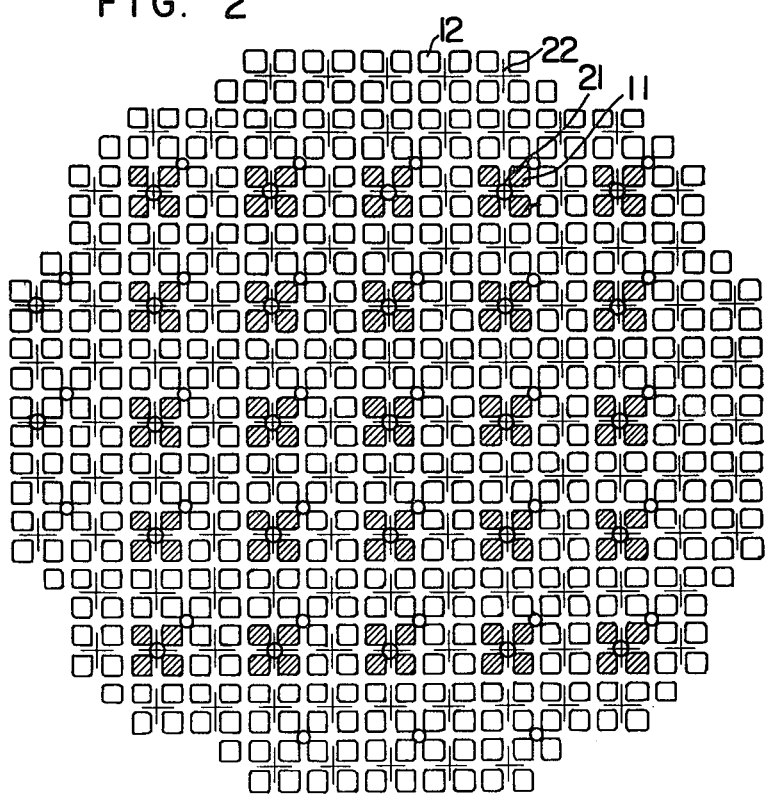
FIG. 2 is a view similar to FIG. 1 but showing the core construction according to the invention.

A preferred embodiment of the invention will be described by referring to FIGS. 2 through 8. FIG. 2 is a view similar to FIG. 1 but showing the core structure of a boiling-water nuclear reactor according to the invention. in FIGS. 1 and 2, like reference characters designate similar parts. In the embodiment of core construction shown in FIG. 2, the same control rods as used in the core construction shown in FIG. 1 are used and the fuel assemblies and control rods are arranged in the same manner as in the core construction shown in FIG. 1. The control rods 21 marked with o are inserted in the core and the control rods 22 having no marks o are fully withdrawn from the core. In the invention, the control rods 21 are used principally for controlling reactor power and the control rods 22 are used principally for shutting down the reactor by quickly withdrawing the same, due to the characteristic features of the fuel assemblies subsequently to be described. Thus the control rods 21 will be referred to as reactor power adjusting control rods and the control rods 22 will be referred to as reactor shutdown control rods in this specification.

The core construction shown in FIG. 2 comprises two types of fuel assemblies 11 and 12. A plurality of groups of fuel assemblies 11, each group consisting of four (4) fuel assemblies 11, and a plurality of groups of fuel assemblies 12, each group consisting of four (4) fuel assemblies 12, are arranged alternately in columns and rows except in the marginal portion of the core where the fuel assemblies 12 alone are located. Each of the reactor power adjusting control rods 21 is located adjacent and surrounded by the four fuel assemblies 11 of each group, and each of the reactor shutdown control rods 22 is located adjacent and surrounded by the four fuel assemblies 12 of each group. Thus the reactor power adjusting control rods 21 are each arranged for every other group of fuel assemblies arranged in rows and columns at right angles to one another, except in the marginal portion of the core.

The fuel assemblies 11 and 12 are each divided into two sections of upper and lower sections in the vicinity of the center of the length thereof. The fuel assembles 11 and 12 are constructed such that the lower section thereof has a smaller mean infinite multiplication factor than the upper section thereof. The boundary between the upper and lower sections is located in the range between ⅓ and 7/12 the length of the assemblies 11 and 12 from the lower end thereof, for reasons subseqently to be described. The difference in mean infinite multiplication factor between the upper and lower sections is produced by reducing the mean uranium enrichment factor of the lower section below that of the upper section.

The fuel assemblies 11 located adjacent the reactor power adjusting control rods 21 and the fuel assemblies 12 located adjacent the reactor shutdown control rods 22 are constructed such that the former have a smaller overall mean infinite multiplication factor than the latter. The difference in overall mean infinite multiplication factor between the two types of fuel assemblies 11 and 12 is produced by reducing the overall mean uranium enrichment factor of the fuel assemblies 11 below that of the fuel assemblies 12.

The fuel assembly 11 in a concrete example is shown in FIG. 3 and Table 1, and the fuel assembly 12 in a concrete example is shown in FIG. 4 and Table 2. The numerals in FIGS. 3 and 4 refer to the fuel rod numbers, and Table 1 and Table 2 show the uranium enrichment factors of the fuel rods. In FIGS. 3 and 4, the numeral 15 refers to the water rods.

TABLE 1

| Fuel Rod No. | Uranium Enrichment Factor | | No. of Rods in One Assembly |
|---|---|---|---|
| | Upper Section (portion above 11/24 the length of rod from its lower end) | Lower Section (portion below 11/24 the length of rod from its lower end) | |
| 31 | 1.3 | 1.3 | 20 |
| 32 | 1.3 | 1.1 | 8 |
| 33 | 1.1 | 0.9 | 16 |
| 34 | 0.9 | 0.7 | 12 |
| 35 | 0.7 | | 4 |
| 36 | 0.9 + (50 Wt.% $Gd_2O_3$) | | 2 |

(Unit of Uranium Enrichment Factor: Wt. %)

TABLE 2

| Fuel Rod No. | Uranium Enrichment Factor | | No. of Rods in one Assembly |
|---|---|---|---|
| | Upper Section (portion above 11/24 the length of rod from its lower end) | Lower Section (portion below 11/24 the length of rod from its lower end) | |
| 31 | 2.5 | 2.5 | 20 |
| 32 | 2.5 | 2.1 | 8 |
| 33 | 2.1 | 1.7 | 16 |
| 34 | 1.7 | 1.4 | 12 |
| 35 | 1.4 | | 4 |
| 36 | 1.7 + (5.0 Wt. % $Gd_2O_3$) | | 2 |

(Unit of Uranium Enrichment Factor: Wt. %)

The upper section of each of the fuel assemblies 11 shown in FIG. 3 and Table 1 has a mean uranium enrichment factor of about 1.1 Wt.% and the lower section thereof has a mean uranium enrichment factor of about 1.0 Wt.%, while the fuel assemblies 11 each have an overall mean uranium enrichment factor of about 1.1 Wt.%. The upper section of each of the fuel assemblies 12 shown in FIG. 4 and Table 2 has a mean uranium enrichment factor of about 2.2 Wt.% and the lower section thereof has a mean uranium enrichment factor of about 2.0 Wt.%, while the fuel assemblies 12 each have an overall mean uranium enrichment factor of about 2.1 Wt.%. The boundary between the upper and lower sections of the fuel assemblies 11 and 12 is located at a point which is 11/24 the length of the fuel assemblies from the lower end thereof.

Figure 5:
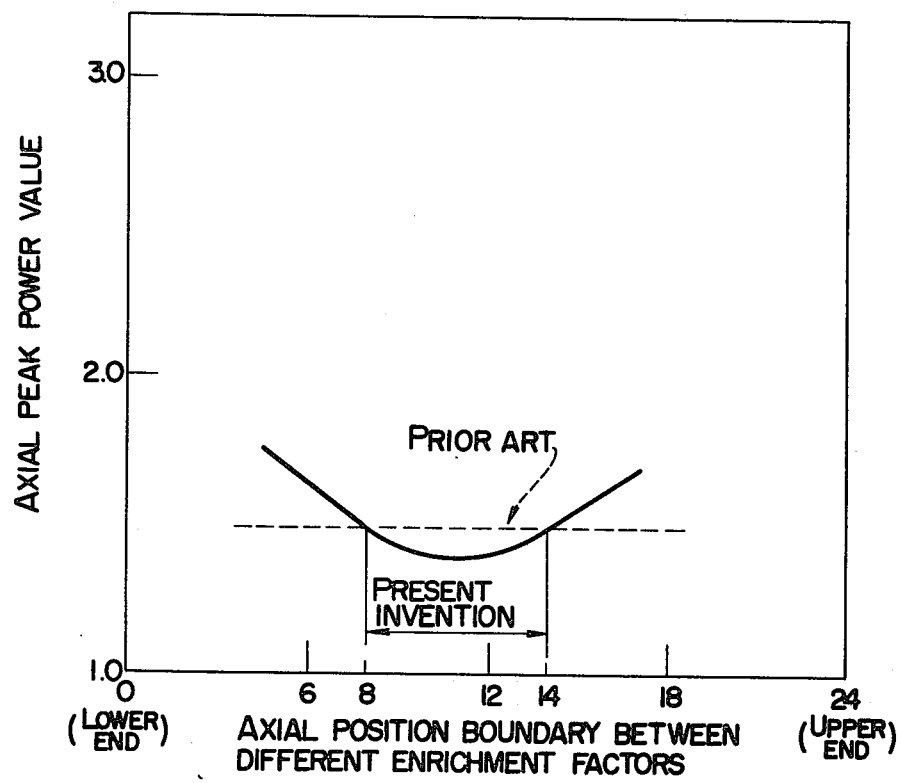
FIG. 5 is a diagram showing the relation between the position of the boundary between different enrichment factors in the fuel assemblies and the peak power value of the core.

FIG. 5 shows why it is desirable that the boundary between the upper section having a larger mean infinite multiplication factor and the lower section having a smaller mean infinite multiplication factor be located at a point which is in the range between ⅓ and 7/12 the length of the fuel assemblies from the lower end thereof. In the diagram shown in FIG. 5, the abscissa represents the axial position of the boundary between different uranium enrichment factors in a fuel assembly and the ordinate indicates the peak power value. In the diagram, the peak power value of 1.5 of the fuel assemblies 1 having gadolinea therein and constituting the conventional core construction shown in FIG. 1 is shown in a broken line. From the diagram, it will be seen that the peak power value is not improved as compared with the corresponding value of the conventional core construction when the boundary between different uranium enrichment factors is located in a position which is below ⅓ the length of the fuel assembly from the lower end thereof or above 7/12 the length thereof from the lower end thereof. It will also be seen that when the boundary between different uranium enrichment factors is located in a position in the range between ⅓ and 7/12 the length of a fuel assembly from the lower end thereof, the peak power value is lower than the corresponding value of the conventional core construction and that the power distribution is more like a plateau than that of the conventional core construction.

By referring to FIGS. 6 to 8, the reasons why the overall mean infinite multiplication factor of the fuel assemblies 11 is made smaller than that of the fuel assemblies 12 and the effects achieved by this arrangement will now be described.

Figure 6:
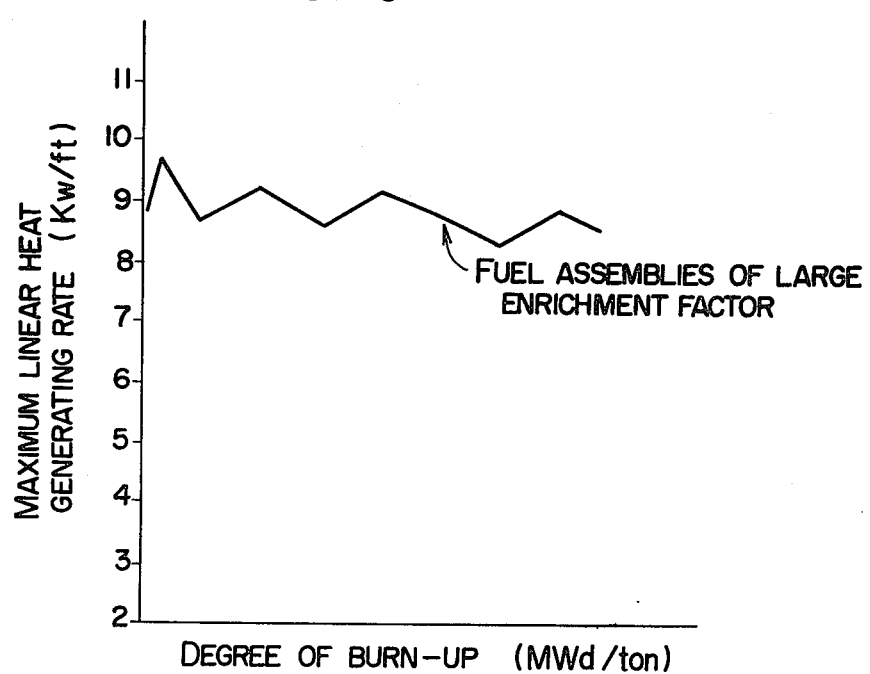
FIG. 6 is a diagram showing the relation between the degree of burn-up and the maximum linear heat generating rate of a core comprising an array of only the fuel assemblies of large enrichment factor shown in FIG. 4.

FIG. 6 is a diagram showing the relation between the maximum linear heat generating rate and the degree of burn-up of a core comprising an array of only the fuel assemblies of large enrichment factor shown in FIG. 4 and Table 2. In the diagram, the abscissa represents the degree of burn-up (MWd/ton) of the core and the ordinate indicates the maximum linear heat generating rate (Kw/ft). From the diagram, it will be seen that the maximum linear heat generating rate of the core is about 10.0 Kw/ft. As aforesaid, it is known that if the linear heat generating rate exceeds about 8 Kw/ft. a PCMI will begin to take place. Therefore, it will be appreciated that it is impossible to freely withdraw the control rods in the core construction shown in FIG. 6 because of the danger of occurrence of a PCMI, since the linear heat generating rate is higher by about 2 Kw/ft. than the critical rate for causing a PCMI.

Figure 7:
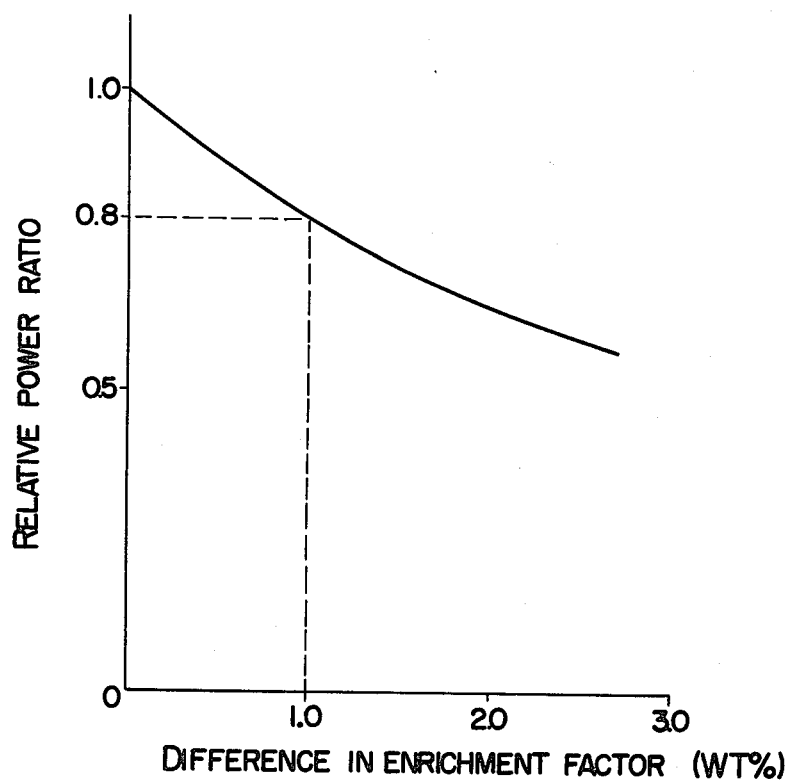
FIG. 7 is a diagram showing the relation between the difference in enrichment factor between the fuel assemblies of large enrichment factor and the fuel assemblies of small enrichment factor and the relative power ratio.

FIG. 7 shows the results of research conducted into changes in reactor power which would be caused by differences in enrichment factor between the fuel assemblies of a certain enrichment factor used as a reference and the fuel assemblies of smaller enrichment factor. In the diagram shown in FIG. 7, the abscissa represents the difference in enrichment factor between the fuel assemblies of large enrichment factor and the fuel assemblies of small enrichment factor in Wt.% and the ordinate indicates the relative power ratio of the latter to the former. From the diagram, it will be seen that the larger the difference in enrichment factor between the fuel assemblies of large and small enrichment factors, the lower is the relative power of the fuel assemblies of smaller enrichment factor. Thus it will be appreciated that, in order to reduce the linear heat generating rate from 10 Kw/ft. to a level below 8 Kw/ft. or to reduce reactor power at a rate of over 2/10=0.2, one has only to make the difference in enrichment factor by about 1.0 Wt.% or more. As a result, it has been ascertained that if the mean uranium enrichment factor of one type of fuel assemblies 11 located adjacent the control rods 21 made smaller than that of the other type of fuel assemblies 12 and the difference in enrichment factor is made larger than about 1.0 Wt.%, it is possible to reduce the linear heat generating rate of the fuel rods surrounding the control rods 21 to a level below 8 Kw/ft. which is the critical rate for causing a PCMI to occur.

As aforesaid, the overall mean uranium enrichment factor of the fuel assemblies of small enrichment factor shown in FIG. 3 and Table 1 is about 1.1 Wt.%, and the overall mean uranium enrichment factor of the fuel assemblies of large enrichment factor shown in FIG. 4 and Table 2 is about 2.1 Wt.%. The difference in enrichment factor between these two groups of fuel assemblies is about 1.0 Wt.%.

Figure 8:
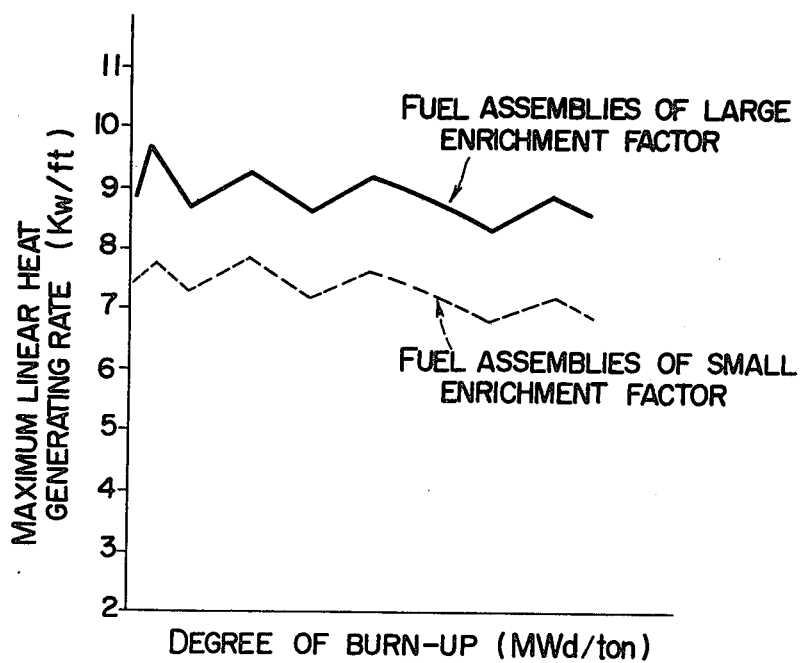
FIG. 8 is a diagram showing the relation between the degree of burn-up and the maximum linear heat generating rate of the core shown in FIG. 2 which comprises an array of the fuel assemblies of small enrichment factor shown in FIG. 3 and the fuel assemblies of large enrichment factor shown in FIG. 4.

FIG. 8 is a diagram showing the relation between the linear heat generating rate and the degree of burn-up in a core construction shown in FIG. 2 in which the fuel assemblies of small enrichment factor shown in FIG. 3 and Table 1 are used as the fuel assemblies 11 and the fuel assemblies of large enrichment factor shown in FIG. 4 and Table 2 are used as the fuel assemblies 12. In the diagram, the abscissa represents the degree of burnup (MWd/ton) and the ordinate indicates the maximum linear heat generating rate, with a solid line representing the fuel rods of fuel assemblies of large enrichment factor and a broken line representing the fuel rods of fuel assemblies of small enrichment factor. From the diagram, it will be seen that the maximum linear heat generating rate of the fuel rods surrounding the reactor power adjusting control rods 21 is below about 8 Kw/ft. Therefore, even if the control rods 21 are withdrawn while the reactor operates to develop power, there is no danger of the occurrence of a PCMI, so that it is possible to withdrawn the control rods 21 as desired.

From the foregoing description, it will be appreciated that by dividing each of the fuel assemblies 11 and 12 into upper and lower sections in the vicinity of the center of the length thereof and making the mean infinite multiplication factor of the lower sections of the fuel assemblies smaller than that of the upper sections and by arranging the two sets of fuel assemblies 11 and 12 as described previously, it is possible to suppress the skewing of a power distribution which would otherwise be caused by an axial void distribution in the core.

Also, by making the overall mean infinite multiplication factor of one type of fuel assemblies 11 located adjacent the reactor power adjusting control rods 21 smaller than that of the other type of fuel assemblies 12, changes caused by the withdrawing of the control rods 21 in thermal load applied to the fuel rods of the fuel assemblies 11 surrounding the control rods 21 can be kept below the level of power which would cause a PCMI to occur, thereby making it possible to keep the fuel in a sound condition. This permits the withdrawing of the control rods 21 to be effected freely, so that the power control system for controlling reactor power during operation of the reactor can be simplified and the time required for effecting reactor power control can be shortened. Thus the present invention is capable of greatly increasing the operation efficiency and economic value of a nuclear reactor. In a nuclear reactor having the core construction of the prior art shown in FIG. 1, it is impossible to reduce the maximum linear heat generating rate of the fuel rods to a level below 8 Kw/ft., unless reactor power is reduced temporarily (which is an economically unacceptable proposition). The present invention makes it possible to reduce the linear heat generating rate of the fuel assemblies surrounding the withdrawn control rods to a level below 8 Kw/ft., without requiring to reduce reactor power. Thus it will be apparent that in a nuclear reactor having the core construction according to the invention the control rods can be freely withdrawn for adjusting reactor power during the operation of the reactor.

What is claimed is:

1. A core construction of a boiling-water nuclear reactor comprising an array of a plurality of fuel assemblies and a plurality of control rods, each fuel assembly including a plurality of fuel rods, and each control rod adapted to be inserted between selected ones of said fuel assemblies, wherein:
   (a) each fuel assembly is divided into two sections substantially in the vicinity of the center of the length of each fuel assembly to form an upper section and a lower section, the lower section having a smaller mean infinite multiplication factor than the upper section;
   (b) said control rods include two groups of control rods, one group of control rods being reactor power adjusting control rods which are at least partially inserted in the core during normal power operation of th reactor for adjusting reactor power, and the other group of control rods being reactor shutdown control rods which remain fully withdrawn from the core during the normal power operation in preparation for shutting down the reactor and are inserted in the core for shutting down the reactor; and
   (c) each of said fuel assemblies located adjacent said reactor power adjusting control rods having an overall mean infinite multiplication factor smaller than the fuel assemblies located adjacent said reactor shutdown control rods when said reactor shutdown control rods are inserted in the core, each of said fuel assemblies located adjacent said reactor power adjusting control rods having a smaller overall mean uranium enrichment factor than each of said fuel assemblies located adjacent said reactor shutdown control rods, and wherein each of said fuel assemblies located adjacent said reactor power adjusting control rods has a mean uranium enrichment factor of about 1.1 Wt.% in the upper section thereof, a mean uranium enrichment factor of about 1.0 Wt.% in the lower section thereof, and an overall means uranium enrichment factor of about 1.1 Wt.%; and wherein each of said fuel assemblies located adjacent said reactor shutdown control rods has a mean uranium enrichment factor of about 2.2 Wt.% in the upper section thereof, a mean uranium enrichment factor or about 2.0 Wt.% in the lower section thereof, and an overall means uranium enrichment factor of about 2.1 Wt.%.

2. A core construction of a boiling-water nuclear reactor comprising an array of a plurality of fuel assemblies and a plurality of control rods, each fuel assembly including a plurality of fuel rods, and each control rod adapted to be inserted between selected ones of said fuel assemblies, wherein:

(a) each fuel assembly is divided into two sections substantially in the vicinity of the center of the length of each fuel assembly to form an upper section and a lower section, the lower section having a smaller mean infinite multiplication factor than the upper section;

(b) said control rods include two groups of control rods, one group of control rods being reactor power adjusting control rods which are at least partially inserted in the core during normal power operation of the reactor for adjusting reactor power, and the other group of control rods being reactor shutdown control rods which remain fully withdrawn from the core during the normal power operation in preparation for shutting down the reactor and are inserted in the core for shutting down the reactor; and (c) each of the said fuel assemblies located adjacent said reactor power adjusting control rods having an overall mean infinite multiplication factor smaller than the fuel assemblies located adjacent said reactor shutdown control rods when said reactor shutdown control rods are inserted in the core, each of said fuel assemblies located adjacent said reactor power adjusting control rods having a smaller overall mean uranium enrichment factor than each of said fuel assemblies located adjacent said reactor shutdown control rods, and wherein the difference in overall mean uranium enrichment factor between said fuel assemblies located adjacent said reactor power adjusting control rods and said fuel assemblies located adjacent said reactor shutdown control rods is at least about 1.0 Wt.%.

3. A core construction as claimed in claim 1 or 2, wherein the boundary between the upper section and the lower section of each said fuel assembly is positioned in the range between $\frac{1}{3}$ and 7/12 the length of each said fuel assembly from the lower end thereof.

4. A core construction as claimed in claim 1 or 2, wherein four (4) of said fuel assemblies form one group and one of said control rods is located adjacent and surrounded by the four fuel assemblies of one group, a plurality of groups of said fuel assemblies are arranged in rows and columns disposed at right angles to one another, and said reactor power adjusting control rods are each arranged for every other group of the fuel assemblies except in the marginal portion of the core.

5. A core construction as claimed in claim 1 or 2, wherein the lower section of each said fuel assembly has a lower mean uranium enrichment factor than the upper section thereof.

6. A core construction as claimed in claim 1 or 2, wherein each said fuel assembly comrpises fuel rods having an axially uniformly distributed uranium enrichment factor and fuel rods having a smaller uranium enrichment factor in the lower section thereof than in the upper section thereof.

7. In a core construction as claimed in claim 1 or 2, wherein each said fuel assembly comprises fuel rods having an axially uniformly distributed uranium enrichment factor and fuel rods having a smaller uranium enrichment in the lower section thereof than in the upper section thereof and the control rods for adjusting reactor power are arranged to be withdrawn freely during normal power operation of the reactor to develop power without the danger of occurrence of pellet-clad-mechanical interaction.

* * * * *